US012747164B2

(12) United States Patent
Olsen

(10) Patent No.: US 12,747,164 B2
(45) Date of Patent: Sep. 29, 2026

(54) METHOD AND APPARATUS FOR FAST IRON AND NICKEL CARBONYLATION

(71) Applicant: Rolf Miles Olsen, West Bloomfield, MI (US)

(72) Inventor: Rolf Miles Olsen, West Bloomfield, MI (US)

( * ) Notice: Subject to any disclaimer, the term of this patent is extended or adjusted under 35 U.S.C. 154(b) by 448 days.

(21) Appl. No.: 18/436,705

(22) Filed: Feb. 8, 2024

(65) Prior Publication Data

US 2024/0279076 A1 Aug. 22, 2024

Related U.S. Application Data

(60) Provisional application No. 63/444,483, filed on Feb. 9, 2023.

(51) Int. Cl.
*C01G 53/02* (2006.01)
*B01J 8/12* (2006.01)

(52) U.S. Cl.
CPC ................ *C01G 53/02* (2013.01); *B01J 8/12* (2013.01); *B01J 2208/00566* (2013.01); *B01J 2208/00769* (2013.01); *B01J 2208/00893* (2013.01)

(58) Field of Classification Search
CPC ... C01G 53/02; B01J 8/12; B01J 2208/00566; B01J 2208/00769; B01J 2208/00893; B01J 8/002
See application file for complete search history.

(56) References Cited

U.S. PATENT DOCUMENTS

| | | | |
|---|---|---|---|
| 1,614,625 | A | 1/1927 | Muller-Cunradi |
| 1,759,268 | A | 5/1930 | Mittasch et al. |
| 1,759,659 | A | 5/1930 | Mittasch et al. |
| 1,783,744 | A | 12/1930 | Mittasch et al. |
| 1,828,376 | A | 10/1931 | Muller-Cunradi |
| 2,254,158 | A | 8/1941 | Simpson |
| 3,342,588 | A | 9/1967 | Mason |
| 3,918,918 | A | 11/1975 | Kohn et al. |
| 4,181,701 | A | 1/1980 | Topsoe |

(Continued)

FOREIGN PATENT DOCUMENTS

| | | | | |
|---|---|---|---|---|
| CN | 109277057 | * | 1/2019 | .......... B01J 19/0013 |
| CN | 109277057 | A | 1/2019 | |

OTHER PUBLICATIONS

Zhou, et al., Stabilizing the active phase of iron-based Fischer-Tropsch catalysts for lower olefins: mechanism and strategy, Chem. Sci. 2019; 10: 6083-6090 (Year: 2019).*

(Continued)

*Primary Examiner* — Daniel C. McCracken

(57) ABSTRACT

The inventions relate to controlling the particle size, and gas flows in moving beds of particles containing metallic iron and/or nickel, wherein the metallic iron or nickel are reactants in carbonylation reactions with carbon monoxide (a component of the flowing gas). The inventions' use is to increase the rates of production of iron carbonyl and nickel carbonyl. The inventions use cross-flow funnels containing moving beds of carbonylation particles (i.e., that contain iron and nickel) and regulation of the removal of those particles from the bottoms of the funnels. Cross-flow refers to the horizontal flow of the carbonylation gas (containing carbon monoxide) through the downward moving beds of carbonylation particles held in the cross-flow funnels.

17 Claims, 4 Drawing Sheets

(56) References Cited

U.S. PATENT DOCUMENTS

| | | | | |
|---|---|---|---|---|
| 4,321,234 | A | 3/1982 | Ohsaki et al. | |
| 4,372,920 | A | 2/1983 | Zardi | |
| 4,423,022 | A | 12/1983 | Albano et al. | |
| 4,936,250 | A | 6/1990 | Wiseman et al. | |
| 4,976,928 | A | 12/1990 | Foester | |
| 5,520,891 | A | 5/1996 | Lee | |
| 5,869,011 | A | 2/1999 | Lee | |
| 2005/0163673 | A1* | 7/2005 | Johnson | B01J 19/123 422/139 |

OTHER PUBLICATIONS

Cui, Carbonylation of Nickel and Iron from Reduced Oxides and Laterite Ore, PhD Thesis University of New South Wales, pp. 1-167 (2015) (Year: 2015).*

San Jose, et al., Solid cross-flow into the spout and particle trajectories in conical spouted beds, Chemical Engineering Science 1998; 53(20): 3561-3570 (Year: 1998).*

Crundwell, F.K., Moats, M.S., Ramachandran, V., Robinson, T.G. and Davenport, W.G. (2011). Carbonyl Refining of Impure Nickel Metal—Chapter 22. Extractive Metallurgy of Nickel, Cobalt and Platinum Group Metals. pp. 269-280. https://doi.org/10.1016/B978-0-08-096809-4.10022-X.

Terekhov, D.S. and Emmanuel, N.V. (2013). Direct extraction of nickel and iron from laterite ores using the carbonyl process. Minerals Engineering; vol. 54 pp. 124-130. https://dx.doi.org/10.1016/j.mineng.2013.07.008.

J. Brynestad (1976) Iron and Nickel Carbonyl Formation in Steel Pipes and its Prevention—Literature Survey.

Mond, R. L., and Wallis, A. E. (1922). Researches on the Metallic Carbonyls. Journal of the Chemical Society, Transactions, vol. 121, pp. 29-32. https://doi.org/10.1039/CT9222100029.

Mond, L., Langer, C. and Quincke, F. (1890). Action of Carbon Monoxide on Nickel. Journal of the Chemical Society, vol. 57, pp. 749-753. https://doi.org/10.1039/CT8905700749.

Ou Zhuo, Lijun Yang, Fujie Gao, Bolian Xu, Qiang Wu, Yining Fan, Yu Zhang, Yufei Jiang, Runsheng Huang, Xizhang Wang, Zheng Hu; Stabilizing the active phase of iron-based Fischer-Tropsch catalysts for lower olefins: mechanism and strategy; Chem Sci.,Web. 2019; 10,6083; pp. 6083-6090.

Xiuqing Gong, Philip W. Miller, Antony D. Gee, Nicholas J. Long, Andrew J. De Mello, Ramon Vilar; Gas-Liquid Segmented Flow Microfluidics for Screening Pd-Catalyzed Carbonylation Reactions; Chemistry Web. 2012; 10.1002/chem.201104059., pp. 2768-2772.

Paul W. Cleary, Mark L. Sawley; DEM modelling of industrial granular flows: 3D case studies and the effect of particle shape on hopper discharge; Applied Mathematical Modelling Web. 2002; DOI: 10.1016/S030-904X(01) 00050-6, pp. 89-111.

Shawn P. Duffy, Virendra M. Purl; Primary Segregation Shear Cell for Size-Segregation Analysis of Binary Mixtures; Department of Agricultural and Biological Engineering, The Pennsylvania State University; Kona. Web. 2002; DOI 10.14356/kona.2002022; pp. 196-207.

* cited by examiner

METHOD AND APPARATUS FOR FAST IRON AND NICKEL CARBONYLATION

CROSS REFERENCE TO RELATED APPLICATION

This patent application claims priority to U.S. Provisional Patent Application No. 63/444,483, titled METHOD AND APPARATUS FOR FAST IRON AND NICKEL CARBONYLATION, filed on Feb. 9, 2023, the entire contents of which are incorporated by reference herein.

FIELD OF THE INVENTION

The inventions relate to controlling the particle size, and pressurized gas flows in moving beds of particles containing metallic iron and/or nickel, wherein the metallic iron or nickel are reactants in carbonylation reactions with carbon monoxide (a component of the flowing gas).

BACKGROUND TO THE INVENTIONS

The inventions are related to the production of iron carbonyl (principally $Fe(CO)_5$ but also, possibly, small amounts of $Fe(CO)_4$ and $Fe_2(CO)_9$), and nickel carbonyl ($Ni(CO)_4$) using the following exothermic carbonylation reactions:

$$Fe(s)+5CO(g)\rightarrow Fe(CO)_5(l\text{ or }g) \quad (1);$$

$$Ni(s)+4CO(g)\rightarrow Ni(CO)_4(l\text{ or }g) \quad (2).$$

These reactions are usually carried out when the input metallic iron and nickel is mixed with other solid material (impurities). And the principal practical point of performing this carbonylation is to separate the iron and nickel, as vapors (sometimes as liquids) of iron carbonyl and nickel carbonyl, from the other solids by removing the vapors and solids from the reactor through separate outlets. Carbonylation is usually followed by carbonyl decomposition (the reverse of carbonylation) to form high purity iron and nickel products. It is also possible to make other metal carbonyls with other transition metals like cobalt, manganese, molybdenum, and copper. However, the rates of formation of these other metal carbonyls are slow in comparison to those for iron and nickel carbonyl, and these other carbonyls do not vaporize so readily as iron and nickel carbonyl.

Carbonyl chemistry started when Langer first noticed the deposition of nickel in pipes in the laboratory of Ludwig Mond. They quickly connected it to carbon monoxide and nickel carbonyl (Mond, Langer, and Quincke, 1890; McNeil, 1990). In 1892 Ludwig Mond set up a pilot plant in Birmingham, England, to produce high purity nickel, using carbonylation and carbonyl decomposition, with ore from Sudbury, Ontario (McNeil, 1990). In 1900 the Mond Nickel Company was founded and started industrial nickel carbonyl processing in 1902 at Clydach, Wales (McNeil, 1990). A three-step process of nickel ore reduction, nickel carbonylation, and nickel carbonyl decomposition to (nearly) pure nickel and carbon monoxide was used by the Mond Nickel Company from its beginning (McNeil, 1990). In the 1920s, BASF/I. G. Farben developed a three-step process of iron ore reduction, iron carbonylation, and iron carbonyl decomposition to (nearly) pure iron and carbon monoxide (U.S. Pat. Nos. 1,828,376 and 1,759,659). BASF is still the largest iron carbonyl producer. It uses distillation and density separation techniques to separate iron, nickel, and other metal carbonyls.

Carbonylation suffers from several reaction slowing and self-stopping mechanisms. Stoffel (1914) discussed a self-stopping property of carbonylation reactions. I. G's Farben's 1924 U.S. Pat. No. 1,759,268 addressed this self-stopping. This patent claimed a method for running an iron carbonylation reactor such that the carbon monoxide flowed "with so great a speed that the iron carbonyl formed is substantially carried away with the gas current" Explaining this the patent said: "Such a speed of the gases is employed, according to this invention, as will prevent either completely or to a substantial amount the deposition of iron carbonyl on the iron which deposition of iron carbonyl would be obnoxious to the progress of the reaction." In other words, unless product liquid iron carbonyl is pulled off the surface of the metal, the liquid deposited on the metal surfaces prevents access of carbon monoxide to these surfaces and stops the carbonylation reaction.

In the 1960s, ESSO research worked on a moving bed reactor for iron carbonylation (U.S. Pat. No. 3,342,588). (Here, a "moving bed" is a downward moving packed bed.) This ESSO reactor was not a success as it suffered from several carbonylation stopping and slowing mechanisms. However, there are at least two advantages of using a moving bed reactor over rotary reactors (which are the longtime standard reactors in industrial nickel carbonylation): (i) a moving bed reactor can be operated continuously, without the need for long and hazardous flushing operations; and, (ii) without the need for rotating seals, it is easier to raise the operating pressures (this raises reaction rates). With ESSO's moving bed new solid particles are dropped onto the top of the moving bed. The bed moves downward through two mechanisms. One mechanism is a combination of gravity and particle size shrinkage—the metallic bed particles are continuously size reduced by carbonylation removing surface metal atoms. The other mechanism is the outlet of material from the bottom of the reactor. Top loading and continuous particle size shrinkage create a particle size gradient within the moving bed, with the largest particles at the top and the smallest at the bottom. ESSO's moving bed reactor injected the CO-rich carbonylating gas into the bottom of their moving bed. This bottom injection had major drawbacks. The pressure gradients needed to push carbonylation gas through beds of particles with diameters of 200, 100, 50, 25, and 10 m are substantial. With the ESSO design, these high-pressure gradients were encountered right at the gas inlets and would have produced slow gas flows throughout most of the moving bed. The ESSO reactors tended to produce iron carbonyl in liquid form, which (A) slowed or stopped the carbonylation reaction in most of the reactor volume, and (B) flowed downward through the bed and probably blocked the bed's interstitial paths making upward gas flow even harder—hence creating another reaction slowing/stopping mechanism. In contrast, successful, long-lived rotary reactors such as the nickel carbonylators at Clydach, Wales and Sudbury, Ontario (both now operated by Vale) do not suffer from highly constricted/restricted gas flows. Those reactors inject carbonylation gas into a large volume above a continuously tumbling bed of carbonylation particles, so that all particle surfaces are repeatedly exposed to a reservoir of carbonylation gas.

Unstable carbonylation bed temperatures were a problem in I. G. Farden high-pressure iron carbonylation reactors (U.S. Pat. No. 1,614,625). Temperature runaway events can lead to complete halts of the carbonylation reaction. Such 1920s I. G. Farben reactors almost certainly used batch-loading and fixed-packed beds. Temperature control in large, fixed-packed beds of carbonylation particles in high-pressure vessels is difficult.

Turning to some chemical reactor art that uses gas cross-flow, in 1994, Jing Lee filed U.S. Pat. No. 5,520,891 for a reactor using horizontal gas flows ("cross-flow") through a tall fixed packed bed of catalyst particles. Horizontal cross-flow would have substantially improved the ESSO-type carbonylation reactor. They are part of the inventions claimed here. Given this overlap, Jing Lee's reactor and reactor process and the reactions it is used for are described with enough depth to highlight differences between the inventions in U.S. Pat. No. 5,520,891 and the present inventions.

Jing Lee's reactor and process were good for exothermic reactions between gases that use a solid catalyst to form gaseous products. In particular, the reactor design and described processes were good for carrying out ammonia synthesis (the Haber-Bosch process), hydrogen or syngas production (the water-gas shift reaction), and methanol synthesis from syngas. These solid-catalyzed gas/gas reactions are large-scale industrial chemistry processes. There is a substantial patent literature presenting alternatives to Jing Lee inventions for carrying out these same reactions, including U.S. Pat. Nos. 3,918,918, 4,181,701, 4,321,234, 4,372,920, 4,423,022, 4,976,928, 5,869,011, and 7,846,417. Most of these alternatives (to Lee's) feature radial or axial/radial gas flows through beds of catalyst particles. Lee's reactor and process features (as inventive elements): (I) a reactant gas distributor, (II) a product gas collector with (III) an intervening fixed packed bed of catalyst material such that (IV) reactant gas passes through the distributor and into the fixed bed of catalyst, (V) this gas then flows across the bed of catalyst and reacts to form product gas, (VI) the product gas continues to flow through the bed of catalyst and out of the bed of catalyst through the product gas collector, further (VII) the catalyst bed is formed of layers generally axially oriented (and perpendicular to the gas cross-flows), (VIII) "banks" (i.e. many) U-bend tubes for heat extraction extend axially up and down between the distributor and collector and are embedded in the bed of catalyst, (IX) heat transfer fluid runs through the banks of U-bend tubes and collects (by heat exchange) the heat of the exothermic reactions going on in the reactor and transports this heat of reaction out of the reactor.

In preferred embodiments of Lee's process invention, the lengths of the paths of gas flows between the gas distributor and the gas collector are roughly equal. Still, the geometry shown in the figures allows for some path length variation. Further, in preferred embodiments illustrated in figures, the various up/down U-bend tubes are not evenly spaced in the horizontal cross-section. Instead, the density of tubes seen in the horizontal section is varied and varied for a purpose. This purpose was to vary the rates at which heat was extracted in different sub-volumes (of the reactor volume between the distributor and collector), and by varying the spatial heat extraction, to control the local temperature in the local sub-volumes, and, by this, to change and optimize the temperature in the catalytic bed relative to the progress of the gas through the bed. Since the optimal reaction temperature changes by locality (for the various gas/gas reactions) due to changes in gas composition as the mole fraction of product increases as the gas flows nearer and nearer to the gas collector.

In Lee's invention, the solids are not reactants but catalysts, the solid catalysts are in a fixed (non-moving) bed of particles (i.e., there is no continuous flow of catalyst particles into or out of the fixed packed bed of catalyst particles), the catalyst particles are not contained in a funnel, and there is no catalyst particle flow regulator. Further, in Lee's invention, the layers of catalyst (1) have many U-bend tubes embedded in them and (ii) are not distinguished by differing catalyst particle size or by differing catalyst material. Instead, Lee's layers of catalyst particles are distinguished by temperature layering enforced by the banks of U-bend tubes: "Successive adjacent tube banks 55 establish successive adjacent catalyst zones 57 having localized heat removal (or heat addition) to effectively partition the catalyst bed reaction zone 41 into multiple catalyst layers (or stages) in a single reactor vessel."

Invention Lexicon:

Now a paragraph to outline the scope of the term "carbonylation gas." Transition metal carbonylation involves the reaction of metals, such as iron and nickel, with carbon monoxide (see Reactions (1) and (2)). Therefore, the essential gas species in a carbonylation gas is carbon monoxide. However, carbonylation can be carried out with gas mixtures that contain gas species beyond carbon monoxide. It is known that small amounts of hydrogen sulfide, as well as vapors or suspended particles of sulfur, selenium, and tellurium, have positive catalytic effects on carbonylation (Hieber & Geisenberger, 1950); while U.S. Pat. No. 1,783,744 mentions the positive reaction rate effects of ammonia, methanol, and formaldehyde. Pichler and Walenda (1940) ran experiments with carbonylation gases with a hydrogen mole fraction as high as 0.6 and a carbon monoxide mole fraction of only 0.3, and they noted the positive reaction rate effects of hydrogen. In addition, carbonyl sulfide (COS) is added to the carbonylation gas used at Clydach in Wales to suppress the formation of thin layers of copper on the surfaces of reduced nickel particles because the copper films can significantly slow the formation of nickel carbonyl (Crundwell et al., 2011). Weak oxidizing gases such as steam and carbon dioxide can be included in a carbonylation gas mixture to selectively suppress the carbonylation of iron while having little effect on the carbonylation of nickel (see U.S. Pat. No. 2,254,158). Oxygen is such a strong oxidizer that it should be kept out of a carbonylation gas as well as possible (U.S. Pat. No. 1,783,744). Inert gas diluents such as nitrogen, argon, and other noble gases are quite acceptable in carbonylation gas and at large mole fractions, so long as the mole fraction of carbon monoxide does not become small. Trace amounts (mole fraction under 0.0003) of many other gas species are unlikely to negatively effect carbonylation. Carbonylation gas can also contain iron carbonyl vapor and nickel carbonyl vapor at well above trace levels, as well as some amount of harder-to-vaporize carbonyls of other transition metals such as cobalt, manganese, and molybdenum. A typical industrial carbonylation gas includes carbon monoxide at large mole fraction (above 0.8), with some fraction of gases with catalytic or positive reaction rate effects (see above), and also carbon dioxide. The carbonylation gas used in the industrial carbonylation reactors at Clydach has a carbon monoxide content of 80-95 vol %, while the reactors at Sudbury use carbonylation gas with 99.5 vol % carbon monoxide (Crundwell et al., 2011). Carbon dioxide tends to creep in with (a) the re-cycling of carbon monoxide liberated from carbonyl decomposition, since this carbonyl decomposition usually also generates some carbon dioxide via the Reverse Boudouard Reaction, and (b) (if used) cracking of natural gas to produce carbon monoxide. As the above discussion documents, a carbonylation gas can have a wide variety of compositions and component gas species.

Another term used in the description is "product-mixture gas." Here a product-mixture gas is a mixture of carbonylation gas and also iron carbonyl vapor and/or nickel carbonyl vapor, wherein (A) product-mixture gas is formed inside a carbonylation reactor by some of the carbon monoxide in carbonylation gas reacting with some iron or nickel inside the reactor to form more metal carbonyl vapor (by Reactions (1) or (2)), and these carbonyl vapors then mix and flow with the remainder of the carbonylation gas forming product-mixture gas, and wherein (B) the product-mixture gas has not yet passed into a carbonyl vapor condenser, and wherein (C) condensation of some (or all) of the iron/nickel carbonyl vapors in the product-mixture gas operationally converts the uncondensed part of the gas from a product-mixture gas back into a carbonylation gas.

As used here, the phrase "carbonylation particles" can refer to any of (A) solid particles that contain metallic iron or nickel, possibly also other materials, and that are input to a carbonylation reactor, (B) the solid residue particles output from a carbonylation reactor, and (C) all the intermediates between these two. A "bed of carbonylation particles" is a collection or bed of solid particles (a granular media) that includes carbonylation particles and may also contain particles made of materials other than metallic iron and nickel.

Three times, the phrase "one or more funnels each aimed generally at the lower end of the vessel shell" appears in the claims, whereas in the specifications, many times, the phrase "downward-pointing, cross-flow funnel" appears. In the specifications and the claims, the phrase "aimed generally at the lower end of the vessel shell" should be synonymous with "downward-pointing." Further, since in the claims a funnel is always a cross-flow funnel, the entire phrase "funnel aimed generally at the lower end of the vessel shell" should be taken to be synonymous with the phrase "downward-pointing, cross-flow funnel." The words and phrases "funnel," "cross-flow," and "downward-pointing, cross-flow funnel" are all defined later in these specifications.

SUMMARY OF THE INVENTIONS

The inventions cover a method and an apparatus for performing carbonylation, i.e., a gas/solid surface reaction, wherein one or more downward moving beds of carbonylation particles are each held in a separate downward-pointing, cross-flow funnel, and carbonylation gas flows across each moving bed in a substantially horizontal cross-flow causing carbonylation to occur and causing iron and/or nickel carbonyl vapors to form. This turns the carbonylation gas into product-mixture gas that then is output from the carbonylation reactor.

In all embodiments, the rate of outflow of solid (carbonylation particle) residue from each downward-pointing, cross-flow funnel is regulated by a flow regulator. This regulator runs while the reactor is operating and at a regular cadence, with the regulator repeatedly alternating between (a) forcing the particles to be stopped in the funnel (most of the time) and (b) allowing the particles to flow out the funnel's bottom end surface (in brief intervals).

In preferred embodiments, the rate of outflow of solid (carbonylation particle) residue from each downward-pointing, cross-flow funnel is regulated so that this outflow rate obeys the "funnel ratios condition." The funnel ratios condition is described fully in the detailed description section. However, briefly, when this condition is obeyed it constrains the size of the particles outlet from the funnels. These output particle size constraints are enumerated by (a) the size of the particles input to the downward-pointing, cross-flow funnels and (b) size ratio features of these funnels.

Advantages of the Inventions

Conventional rotary kiln reactors require rotary seals for axial gas pipes to the toxic interior of the reactor—such rotary seals are difficult to make safe for reactors operating at high pressures. In contrast, the above process and apparatus is implemented in a moving bed reactor architecture which does not require the input and output gas pipes to go on a rotation axis with rotating high pressure seals—this adds simplicity, reliability and lower cost as well as safety, and enables the use of higher operating pressures (than, for example, the 70 bar used at the Sudbury reactors (Crundwell et al., 2011)). Operating pressures over 200 bar can be achieved inside the invention's reactor with its static pressurized shell. Raising the operating pressure provides a substantial extra multiple to the reactor's yield, since reaction rates scale strongly up with operating pressure. According to Pichler and Walenda (1940) carbonylation reaction rates increase with the partial pressure of carbon monoxide raised to the 1.76 power and Ludwig Mond's son found a similar pressure dependency (Mond and Wallis, 1922). So, according to the Pichler and Walenda (1940) relationship, the reaction rates for the current inventive reactor architecture operating at 200 bar will be 6.3 ($=(200/70)^{1.76}$) times faster than the reaction rates inside the Sudbury reactors.

Enforcing the funnel ratios condition drives the moving beds (in the funnels) to reach desirable physical conditions. In particular, it drives the vertical variation in bed particle sizes to a dynamic steady state size distribution (measured against vertical height); secondly, this steady state size distribution is one in which, at all heights in the bed, there is a (nearly) constant number of particles from the gas inlet side of the bed to the gas outlet side of the bed; thirdly, this constancy allows the moving bed to have near-uniform rates of horizontal gas flows and nearly uniform temperatures across the bed; fourthly, given the third benefit, it is straightforward to (a) bring the whole bed to an optimal operating temperature at the given operating pressure.

While the physical conditions just described are optimized when the regulation of particle outflows from the bottoms of funnels is done according to the funnel ratios condition, just running the regulator continuously at a regular cadence will, with the funnel form, drive the carbonylation particles to adopt a size distribution (measured in the vertical direction) that provide beneficial gas flow conditions that improve the rates of the carbonylation reaction in the moving beds inside the funnels.

Speeding carbonylation can provide significant environmental and economic advantages. This is because fast carbonylation may replace highly destructive nickel ore processing methods, including heap and high-pressure acid leaching, sulfiding, and energy-intensive molten matte and slagging processes. Further, fast carbonylation applied to laterite ores should produce solid residues that include alumina and many other valuable minerals, wherein this residue can be post-processed to produce many separated, high-value concentrates. In contrast, leaching and matte/slagging methods lose the alumina to hard-to-extract aluminum compounds generally left in tailings and slag. And although the leaching and matte/slagging methods are usually good at making valuable concentrates of platinum group metals, post-processing of the solid residues of carbonylation (of laterite ores) can also recover high value concentrates of platinum group metals, rare-earth metals (Terekhov and Emmanuel, 2013) and other valuable minerals and metals. Present nickel laterite ore processing also treats the dominant iron oxy-hydroxides and hydrated iron oxide minerals in laterite ores as nuisance material. Although they spend energy on converting these iron-containing minerals into dehydrated iron oxides and then spend even more energy reducing some iron oxide to metallic iron; after this energy expenditure, the iron ends up largely unused. In contrast, carbonylation produces iron carbonyl and nickel carbonyl that are readily separable by distillation; pure iron carbonyl can then be decomposed into one of the most valuable iron products, that is, high purity iron powder, suitable for many iron/steel powder metallurgy and printing processes. There are very large global deposits of laterite ores containing hydrated iron oxides at large mass percentage (well above 50%). Laterite drying followed by hydrogen reduction, fast carbonylation, and carbonyl decomposition may produce a large amount of iron suitable for high-value iron and steel products as well as residues from carbonylation that concentrate valuable minerals. Such residues can contain platinum group metals, rare earth elements, chromium and more than five other valuable metals.

Conventional rotary kiln reactors use batch unloading and loading of the solids, extensive gas flushing operations (to remove toxic carbon monoxide and very toxic metal carbonyl vapors), and carbon monoxide re-charging. This batch operation loses a considerable amount of operating time. According to Crundwell et al. (2011), only two out of the three rotating reactors at Sudbury operate at any one time. Further, the gas flushing operations either lose large amounts of carbon monoxide or require energy-intensive gas separation methods to reclaim the carbon monoxide. The present inventions provide a reactor that can operate continuously. This continuous operation avoids the environmental safety and energy problems associated with toxic gas flushing; it is also simpler and easier to carry out.

BRIEF DESCRIPTION OF THE DRAWINGS

The previous summary and the following detailed descriptions are to be read in view of the drawings which illustrate particular exemplary embodiments and features as briefly described below.

The summary and detailed descriptions, however, are not limited to only those embodiments and features explicitly illustrated.

DETAILED INVENTION DESCRIPTIONS

Geometric properties of physical funnel structures are elements of the inventions presented. This detailed description starts by reviewing/defining some geometry of funnels.

Figure 1:
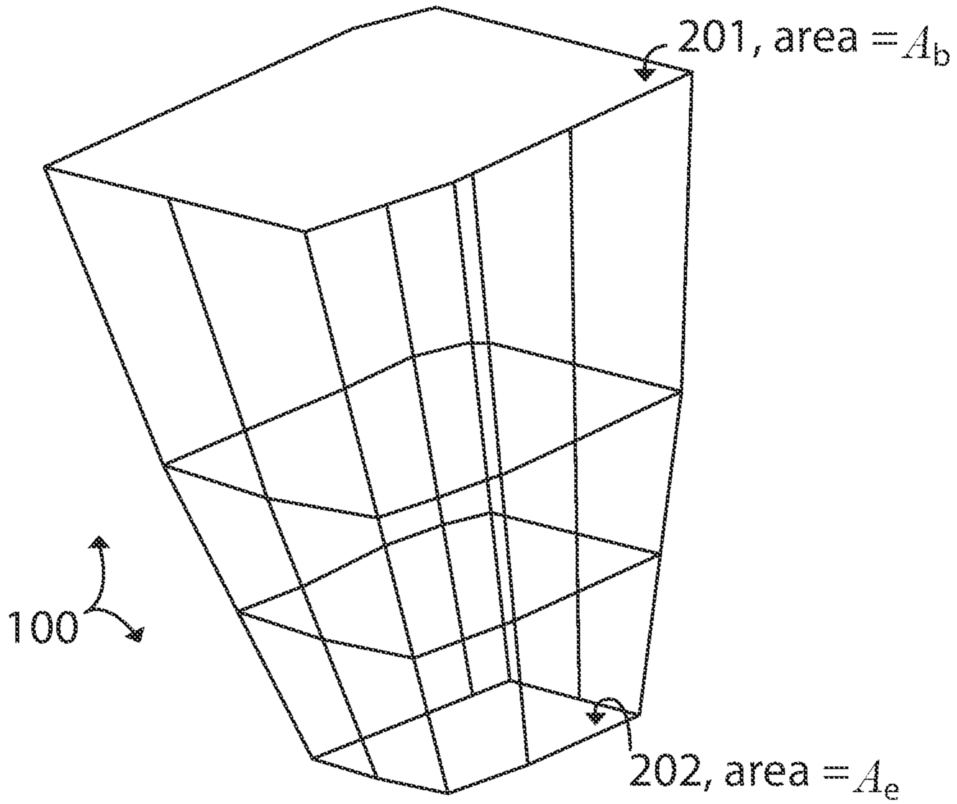
FIG. 1 is a quarter view, orthographic projection of a funnel shape.

Funnel Shapes and (Physical) Funnels:

Referring to the quarter-view, orthographic projection FIG. 1, here a funnel shape 100 has two substantially flat, substantially parallel planes called the "top base surface" 201 and the "bottom end surface" 202. The example funnel illustrated in FIG. 1 has a base surface shape that is substantially rectangular but is an irregular octagon.

For the present invention, a physical funnel is a structure with walls substantially shaped to follow a funnel shape such that the structure is open at the base and end surfaces (i.e., the walls do not block the base and end surfaces). Hereafter, the single word "funnel" refers to a physical funnel.

Further, the area of the end surface, denoted $A_e$, is less than the area of the base surface, denoted $A_b$ (in mathematical notation: $A_e<A_b$). The value of $\sqrt{(A_e/A_b)}$ for the funnels used in the present inventions is important for process control.

Figure 2A:
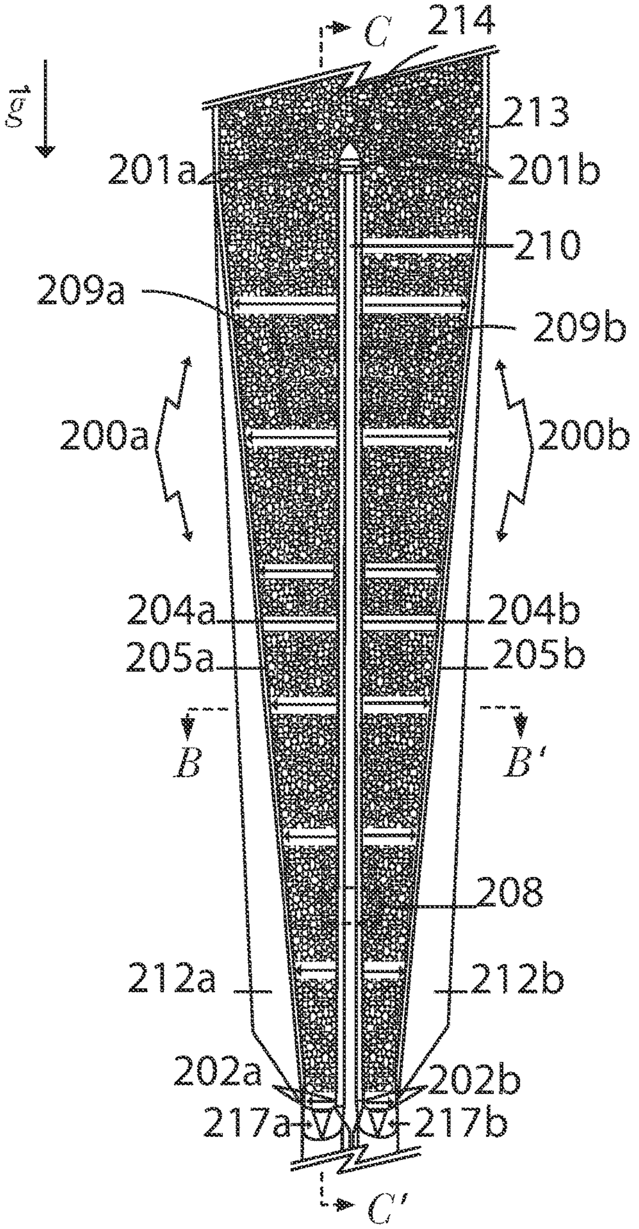
FIG. 2*a* is a vertical section through two downward moving beds of carbonylation particles each in a downward-pointing, cross-flow funnel with horizontal carbonylation gas cross-flows and output particle flow regulation.

Downward-Pointing, Cross-Flow Funnel:

FIG. 2*a* is a vertical section through two downward-pointing, cross-flow funnels (200*a* & 200*b*). Downward-pointing, cross-flow funnels are funnels such that: (i) the top base surfaces 201*a*, 201*b* and bottom end surfaces 202*a*, 202*b* are held substantially horizontal; (ii) their bottom end surfaces 202*a*, 202*b* are held below their top base surfaces 201*a*, 201*b* (a gravity vector, g, indicates down in the figure); (iii) have rectangular or substantially rectangular base surfaces and horizontal sections 203*a*, 203*b* (see FIG. 2*c*, a horizontal section); (iv) each funnel has a gas-permeable wall (204*a* & 204*b*) for gas cross flow inputs, (v) each funnel has a gas-permeable wall (205*a* & 205*b*) for gas cross flow outputs; (vi) at any given height, the horizontal sections of the gas-permeable input and output walls are substantially parallel to each other (e.g., referring to horizontal section FIG. 2*c*, the horizontal input wall section 204*a* is substantially parallel to 205*a*); (vii) the substantially rectangular horizontal sections of downward-pointing, cross-flow funnels have substantially similar aspect ratios at all heights of these funnels; (viii) each funnel has walls (for example, for funnel 200*a*, walls 204*a*, 205*a* (FIG. 2*a*), 206*a* (FIG. 2*d*)) that can horizontally constrain a bed of particles 209*a* to remain inside the funnel (when the bed of particles is regulated to stop the particles flowing out of the bottom end surface 202*a*).

Pressure Vessels:

The inventions use downward-pointing, cross-flow funnels wherein each of these funnels is placed inside a pressure vessel. A single pressure vessel can enclose more than one downward-pointing, cross-flow funnel.

Figure 3:
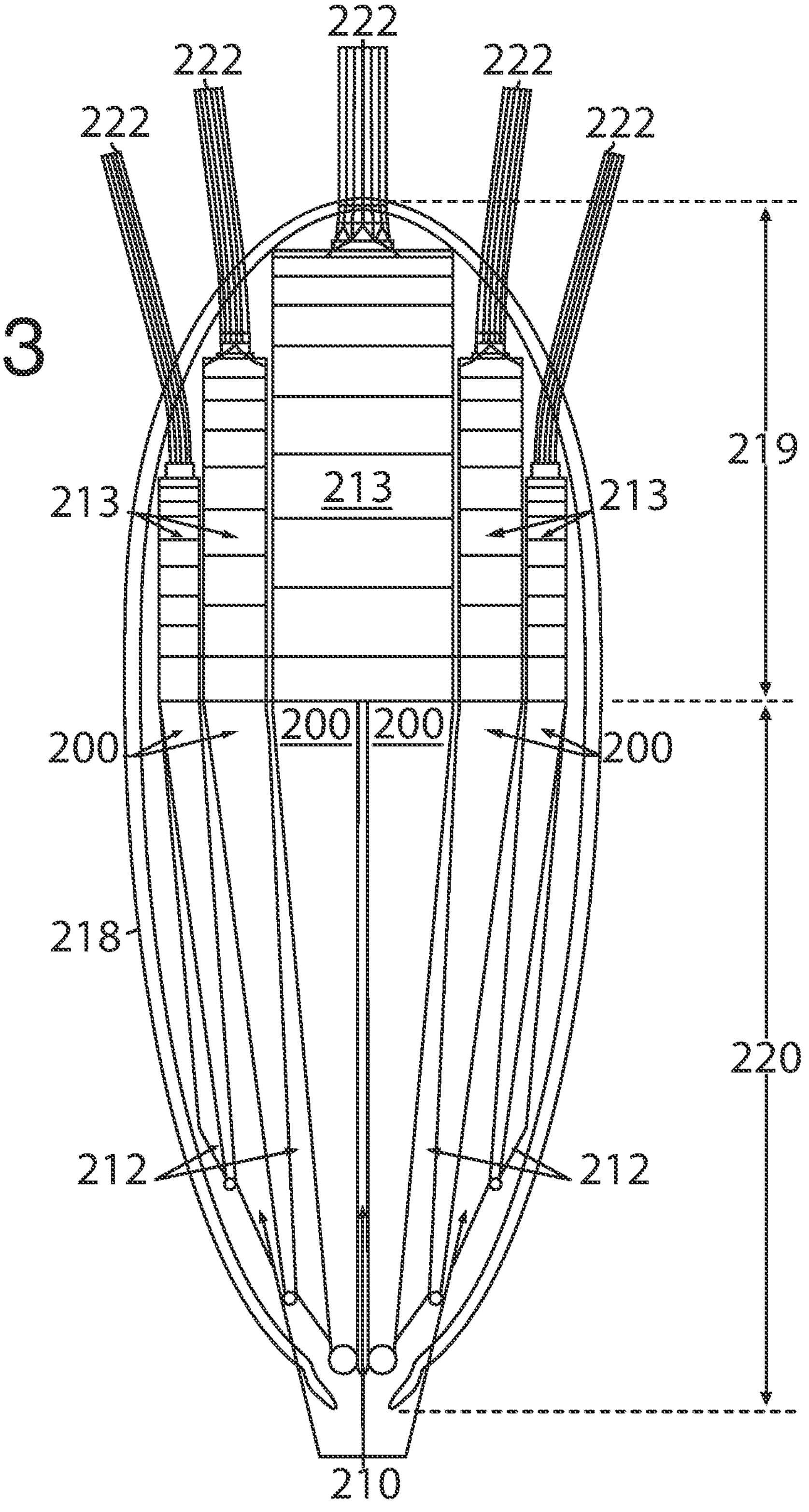
FIG. 3 is a vertical section through a carbonylation reactor showing the arrangement (interior to an outer pressure vessel shell) of six downward-pointing, cross-flow funnels, along with their supporting gas distributors, gas collectors and particle hoppers.

Vertical section FIG. 3 indicates one embodiment to fit six downward-pointing, cross-flow funnels 200 inside a single reactor pressure vessel shell 218. Note the two downward-pointing, cross-flow funnels 200*a* and 200*b* shown in FIG. 2*a* would fit into FIG. 3 as the two central and largest downward-pointing, cross-flow funnels 200 shown in FIG. 3.

The example embodiment in FIG. 3 also has three gas distributor volumes 210, four gas collector volumes 212, and five inlet particle hopper structures 213. The five hopper structures 213 are in an upper zone 219, while the funnels 200, distributors 210, and collectors 212 are in a lower zone

220. In this FIG. 3 example, the funnel top base surfaces 201*a*, 201*b* of FIG. 2*a* would lie vertically at the line separating the upper zone 219 and lower zone 220 in FIG. 3.

There are many possible ways to arrange downward-pointing, cross-flow funnels, distributor volumes, collector volumes, hopper structures, plenums/pipes, etc., inside a single pressure vessel shell. The inventive claims apply to all these possible arrangements.

In the example of FIG. 3, carbonylation particles are inlet to the hoppers 213 by the particles falling through inlet pipes 222. Carbonylation gas is inlet to the cross-flow funnels 200 through pipes that cross the pressure vessel wall 218 that feed internal pipes or plenums (such as 215 in FIG. 2*c*) that pass the carbonylation gas into the cross-flow funnels 200. Such carbonylation gas inlet pipes and plenums are out of the plane of the vertical section of FIG. 3, for example, above the plane of section FIG. 3. Product-mixture gas is outlet from the cross-flow funnels 200, and on out of the pressure vessel 218 by flowing from the cross-flow funnels 200 into internal pipes or plenums (such as 216*a* and 216*b* in FIG. 2*c*) that meet with external pipes at the pressure vessel 218 wall. The connections of the pipes or plenums with the external pipes are out of the plane of section FIG. 3, for example, below the plane of FIG. 3.

Inventions:

Downward-pointing, cross-flow funnels are used in both a method invention and an apparatus invention for carrying out carbonylation of moving beds of carbonylation particles using cross-flows of carbonylation gas and regulation of particle size at the bottom of the moving beds.

Figure 2B:
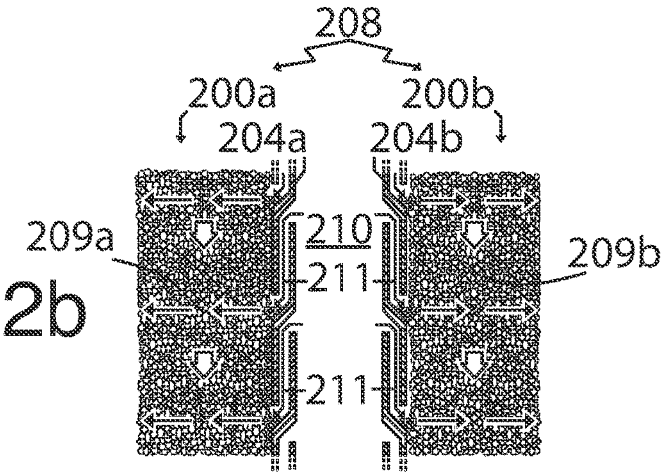
FIG. 2*b* shows details of the vertical section FIG. 2*a;*

FIG. 2*b* is a detail blow-up of the square region 208 of the vertical section FIG. 2*a*. Common to both FIG. 2*a* and FIG. 2*b* are moving beds of carbonylation particles 209*a* and 209*b* moving downward in, respectively, downward-pointing, cross-flow funnels 200*a* and 200*b*, as well as gas-permeable walls for gas cross flow inputs 204*a*, 204*b* to beds 209*a* and 209*b* and a gas distributor volume 210. The downward movement of the bed of carbonylation particles is indicated in FIG. 2*b* by the broad white arrows. Pressurized carbonylation gas is input to the reactor through inlets through the reactor's pressure vessel shell, this inlet gas is directed into the gas distributor volume 210 via pipes and/or a plenum (215 in FIG. 2*c*), the flow of this gas into distributor volume 210 is perpendicular to the plane of FIG. 2*b* and FIG. 2*a* (i.e., in or out of the page). The only routes for the gas in distributor 210 to leave this distributor are through the gas permeable walls for gas cross flow inputs 204*a*, 204*b* and these flows (that are indicated by narrow black arrows in FIG. 2*b*) input carbonylation gas into the beds 209*a* and 209*b*. In FIG. 2*b* the gas-permeable walls 204*a*, 204*b* are made to be gas-permeable by gas flow passages 211 that allow gases to pass easily across these walls, but that do not allow the solid particles in the moving beds 209*a* and 209*b* to move across these walls into the distributor volume 210. A single gas distributor volume does not have to distribute gas into two moving beds, in alternate embodiments a single distributor volume can distribute gas to just one or more than two moving beds of carbonylation particles.

Figure 2C:
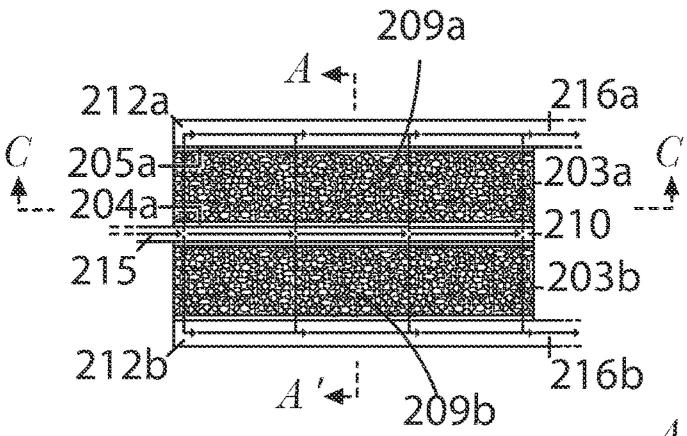
FIG. 2*c* is a horizontal section through two downward moving beds of carbonylation particles each in a downward-pointing, cross-flow funnel with horizontal carbonylation gas cross-flows.
Figure 2D:
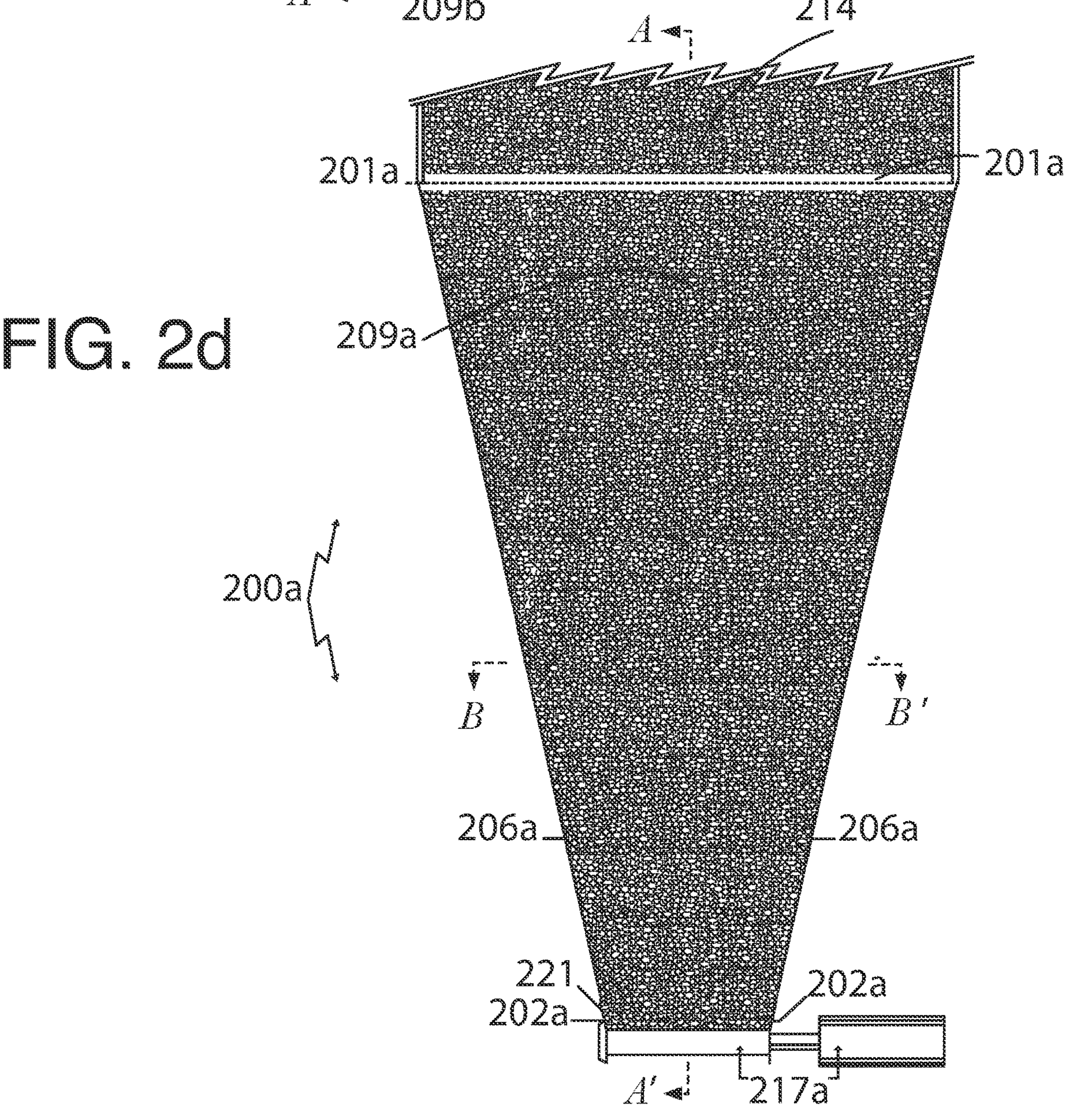
FIG. 2*d* is a vertical section through one downward moving bed of carbonylation particles in a downward-pointing, cross-flow funnel with output particle flow regulation.

The narrow, black, horizontal arrows shown in FIG. 2*a*, FIG. 2*b*, and FIG. 2*c*, indicate cross-flows of gas (a) from the distributor volume 210, (b) into the two moving beds 209*a* and 209*b* of carbonylation particles (inside the downward-pointing, cross-flow funnels 200*a* and 200*b*), (*c*) across these moving beds substantially horizontally—the cross-flow—while the particles move downward, (d) and into two gas collector volumes 212*a* and 212*b* (through the gas-permeable walls for cross flow outputs 205*a*, 205*b*). The gas in these cross-flows enters the moving beds as carbonylation gas, and exits these beds as product-mixture gas (since some of the carbon monoxide is involved in carbonylation reactions (1) and (2)). The two gas-permeable walls for cross-flow outputs 205*a*, 205*b* can have a similar construction to the input gas-permeable walls for gas cross flows outputs 204*a*, 204*b*, that is, with similar internal passages for gas flow. Preferably, gas-flow passages (such as 211 in FIG. 2*b*) should be evenly placed in many locations across the input and output gas-permeable walls (204*a*, 204*b*, 205*a*, and 205*b*) so that gas flows across the moving beds (209*a* and 209*b*) should be substantially horizontal in most locations inside these moving beds.

In the embodiment of FIG. 2*a*, immediately above the two downward-pointing, cross-flow funnels 200*a* and 200*b*, is a hopper structure 213 that contains a buffering moving bed of carbonylation particles 214. There are open connections between the hopper 213 and the cross-flow funnels 200*a* and 200*b*; hence also, there are open connections between the buffering moving bed 214 and the moving beds 209*a* and 209*b* inside the cross-flow funnels. So these funnels are kept full by the buffering bed 214. These open connections fill the hopper structure 213 with pressurized product-mixture gas. These open connections will also allow some looping gas flows (indicated in FIG. 2*a* by arching arrows) from the tops of the gas-permeable input walls 204*a*, 204*b* through the buffering bed 214 and into the tops of the gas-permeable output walls 205*a*, 205*b*. Given the presence of the gas containing carbon monoxide inside the hopper, carbonylation will occur in the buffering moving bed of carbonylation particles 214. The downward movements of beds 209*a*, 209*b*, and 214 ensure that all iron and nickel carbonyl formed in the buffering bed 214 will be pulled out of the beds through the gas-permeable output walls 205*a*, 205*b*. Carbonylation particles are input to the hopper structure 213 from an inlet pipe at the top of the hopper (see 222 in FIG. 3) that connects to a particle inlet to the reactor's pressure vessel shell. The minimum depth of the particles in the buffer bed 214 should preferably not become small in comparison to the cross-flow width of the top base surfaces 201*a*, 201*b* of the downward-pointing, cross-flow funnels 200*a* and 200*b*; in particular, this minimum depth (of the buffer bed) should preferably be at least 0.35 times this width, more preferably 0.5 times this width. In these embodiments, the cross-flow width of the base surfaces of the funnels is the width of these rectangles in the plane of FIG. 2*a*. The point of keeping the minimum depth of the buffer bed above this relative size is to avoid creating an easy flow path (for the gas flowing between the input and output gas permeable walls) that avoids passing through most of the moving beds inside the funnels.

FIG. 2*c* shows typical gas flow pathways (indicated by narrow black arrows) through the gas distributor volume 210, the moving beds of carbonylation particles 209*a*, 209*b*, and into the gas collector volumes 212*a*, 212*b*. FIG. 2*c* is a horizontal section across the section line BB' shown in FIG. 2*a*. The gas flows into the distributor 210 from a plenum or pipe 215. The plenum or pipe 215 preferably causes minimal gas flow friction for transporting gas into the distributor 210; for example, a plenum 215 could be as tall and as wide as the distributor 210 at the join of the two (210 and 215). The other end of the plenum/pipe 215 connects to a carbonylation gas inlet to the reactor through the reactor's pressure vessel shell (218 in FIG. 3). With similar apparatus, the product-mixture gas in the collector volumes 212*a*, 212*b* flows into a corresponding plenum or pipe 216*a*, 216*b*, and these (216*a* and 216*b*) connect the product-mixture gas flows to one or more reactor gas outlets through the pressure vessel shell of the reactor (218 in FIG. 3).

Another inventive element involves the regulation of the size of the carbonylation particles inside the moving beds of carbonylation particles (209*a* & 209*b*). This regulation sets the carbonylation particle diameters along the vertical height in the cross-flow funnels (200*a* & 200*b*). While operating a carbonylation reactor of the present inventions, the regulation of carbonylation particle diameters across the vertical height of the moving beds of carbonylation particles (209*a* & 209*b*) in the cross-flow funnels (200*a* & 200*b*) is achieved by running the regulators (217*a* & 217*b*) associated with each moving bed (217*a* associated with 209*a*; 217*a* associated with 209*b*) at a regular cadence, with the regulators (217*a* & 217*b*) repeatedly alternating between condition (A) where the regulators (217*a* & 217*b*) force the moving beds of particles (209*a* & 209*b*) to be stopped in their respective funnels (200*a* & 200*b*) (most of the time) and condition (B) where the regulators (217*a* & 217*b*) allow the particles at the bottoms of the moving beds (209*a* &209*b*) to flow out of each funnel's bottom end surfaces (202*a* & 202*b*) (in brief intervals), where conditions (A) and (B) repeat over and over while the reactor is operating. The time-averaged flow rate of particles out of the bottom end surfaces (202*a* & 202*b*) of the cross-flow funnels (200*a* &200*b*) can be regulated (varied) by the regulators (217*a* & 217*b*) by varying the details of the stopped (A) and flow (B) conditions in the repeated regulation cadence. For example, the number of times the regulators (217*a* & 217*b*) turn to the flow condition (B) in one hour can be greatly varied; for example, from once in one hour to 600 times in one hour. Another way for the flow regulators (217*a* & 217*b*) to change the time-averaged flow rate of particles out of the bottom of the cross-flow funnels (200*a* & 200*b*) is to increase or decrease the number of particles flowing down through the bottom end surfaces (202*a* & 202*b*) in each instance of the flow condition (B).

Such variation (regulation) of the time-averaged flow rate out of the bottom of the cross-flow funnels (200*a* & 200*b*) will change the distribution of particle sizes in the moving beds (209*a* & 209*b*); since (a) the moving beds are moving beds of carbonylation particles, (b) such variations will change how long each individual carbonylation particle is contained in the cross-flow funnels (200*a* & 200*b*), hence, (c) such variations will change how long each individual particle is exposed to carbonylating conditions, hence (d) such variations will change how much each individual carbonylation particle (that is dominated in composition by iron and/or nickel) shrinks in size due to carbonylation of iron and nickel on each particle's exposed surfaces. So, in particular, such variation (regulation) of the time-averaged flow rate out of the bottom of the cross-flow funnels (200*a* & 200*b*) will change the average size of the carbonylation particles, leaving these funnels through their bottom end surfaces (202*a* & 202*b*). Operating the regulators (217*a* & 217*b*) with slower time-averaged flow rates and long particle residence times in the cross-flow funnels (200*a* & 200*b*) will cause the average particle sizes of particles leaving these funnels (through their bottom end surfaces, 202*a* & 202*b*) to be smaller than when the regulators (217*a* & 217*b*) operate to produce a faster time-averaged flow rate. Note, also, that such variation of the operation of the regulators (217*a* & 217*b*) also changes the average carbonylation particle size at any height in the moving beds (209*a* & 209*b*) since there is always a gradient in average carbonylation particle sizes with their height position inside the funnels (200*a* & 200*b*) and moving beds (209*a* & 209*b*). These height-varied particle size gradients occur because the lengths of time each carbonylation particle is exposed to shrinking carbonylating conditions varies with height in the moving beds (209*a* & 209*b*), these beds are moving and downwards. In particular, the carbonylating particles at the tops of the moving beds are exposed to shrinking carbonylating conditions for the shortest times (among the particles in the beds). Hence, these top particles have the largest average size. Further, as the individual particles move downwards in the moving beds (209*a* & 209*b*), they are exposed to shrinking carbonylating conditions for longer and longer and, hence, become smaller and smaller.

The details of the particle size gradients of carbonylation particles inside the cross-flow funnels (200*a* & 200*b*) and moving beds (209*a* & 209*b*) change the details of the cross-flows of carbonylation gases through these moving beds. Changes to the particle size gradients change both the rates of cross-flows of carbonylation gases and the temperatures of the carbonylation particles at various sub-volumes of the moving beds (209*a* & 209*b*). The carbonylation bed temperatures should be stable, controllable, and uniform (U.S. Pat. No. 1,614,625). It is an inventive claim that stable, uniform temperatures for moving beds of carbonylation particles will be obtained in downward moving beds (209*a* & 209*b*) in cross-flow funnels (200*a* & 200*b*) if the regulators (217*a* & 217*b*) regulate the particle sizes to obey the funnel ratios condition. This claim is based on a particle bed feature promoted by enforcing the funnel ratios condition. This feature is that the number of particles found in any horizontal slice of the moving bed is constant, whatever the height in the bed that the slice is made. Further, if the regulators enforce the funnel ratios condition and appropriate gas pressure differences are applied between the funnel's (200*a* & 200*b*) carbonylation gas distributor volumes (204*a* & 204*b*) and their product-mixture gas collection volumes (205*a* & 205*b*) then the temperature in the moving beds (209*a* & 209*b*) can be stable, uniform, and optimal for fast carbonylation rates.

The details of the funnel ratios condition are determined by the details of the geometry of each cross-flow funnel (to which the condition is applied) and the sizes of the particles input to the top of each funnel (through its open top base surface, 201*a* or 201*b*). Before specifying the funnel ratios condition, a definition is given for a ratio for lengths of features of the bottom end (202*a* or 202*b*) surfaces and top base surfaces (201*a* or 201*b*) of each particular downward-pointing, cross-flow funnel. This ratio is called the "bottom-to-top length ratio" of a cross-flow funnel. It is defined as the square root of the fraction formed by dividing a funnel's bottom end surface area ($A_e$, see example in FIG. 1) by this funnel's top base surface area ($A_b$, see example in FIG. 1), that is, $\sqrt{(A_e/A_b)}$, where $A_e$& $A_b$ were previously described and illustrated with FIG. 1. Obeying the funnel ratios condition requires that the average diameter of the carbonylation particles that are allowed to flow out of a downward-pointing, cross-flow funnel (through the funnel's bottom end surface, 202*a* or 202*b*) is restricted to be within 10% of a target diameter computed as the product of the funnel's bottom-to-top length ratio and the average diameter of the input carbonylation particles that are allowed to flow into this funnel (through the funnel's top base surface, 201*a* or 201*b*).

An example of the application of the funnel ratio condition is now given. In this example, the cross-flow funnel has a base surface area ($A_b$) of 128 $cm^2$ and an end surface area ($A_e$) of 8 $cm^2$, and the average input particle diameter is 1 mm. This example case has a bottom-to-top length ratio of 0.25 ($=\sqrt{(8cm^2/128cm^2)}$) and a target diameter for output particles of 0.25 mm (=0.25×1 mm).

Table 1 provides more examples of average output particle diameters obeying the funnel ratios condition for downward-pointing, cross-flow funnels with bottom-to-top length ratios of 0.75 and 0.25 and three different, typical average diameters for input carbonylation particles to these funnels.

TABLE 1

| Average diameter of carbonylation particles input to funnel (μm) | Bottom-to-top length ratio | Target average diameter of carbonylation particle output from funnel (μm) |
|---|---|---|
| 512 | 0.75 | 384 |
| 512 | 0.25 | 128 |
| 256 | 0.75 | 192 |
| 256 | 0.25 | 64 |
| 128 | 0.75 | 96 |
| 128 | 0.25 | 32 |

A practical extreme high value for the bottom-to-top length ratio is 0.99, and a practical extreme low value for the bottom-to-top length ratio is 0.01.

Some mechanical device is needed to regulate the flow of carbonylation particles out of the end surface of a downward-pointing, cross-flow funnel. A rotary valve is a suitable mechanical device for such particle flow regulation, although systems of moveable flaps may be used instead. In FIG. 2*a*, two rotary valves 217*a*, 217*b* are shown under the two funnels 200*a*, 200*b* (one valve per funnel). In alternate embodiments it is possible for one rotary valve to regulate the flows out of two funnels. While in the perpendicular vertical section FIG. 2*d* (this section is along the section line CC' in FIG. 2*a*), rotary valve 217*a* is again shown under funnel 200*a*. To obey the funnel ratios condition, some control signals are needed to run the rotary valve 217*a* (or system of flaps). In this embodiment, window 221 is built into one of the non-gas-permeable walls 206*a* of the funnel 200*a*. Such a window 221 can be aligned with another window in the shell of the reactor's pressure vessel (218 in FIG. 3) and a video camera to obtain real-time video information on bed particle sizes next to the bottom end surface 202*a*. This real-time information can then be analyzed to produce a real-time control signal for the rotary valve 217*a*. Another method for generating a control signal for the rotary valve would be to monitor the size of the particles as they leave the reactor's pressure shell. Yet another method is to use a look-up table for rates to run the rotary valve under all expected operating conditions (where prior experiments and/or simulations create the look-up table). Other methods include combinations of the three just given.

What is claimed is:

1. A method for performing carbonylation of beds of carbonylation particles, the method comprising:

forming a moving bed of carbonylation particles;

forming a reactor comprising an outer reactor pressure vessel shell wall and an interior to the shell wall, wherein the shell wall has an upper end and a lower end with one or more inlets for carbonylation particles formed toward the upper end of the shell wall and one or more outlets for carbonylation particles formed toward the lower end of the shell wall, and with one or more gas inlets and outlets formed through the shell wall, and wherein the interior to the shell wall includes/contains one or more carbonylation gas distributor volumes, one or more product-mixture gas collector volumes, and also one or more funnels each aimed generally at the lower end of the vessel shell, the funnels each being cross-flow funnels, that is, with a first inlet gas-permeable wall section and a second outlet gas-permeable wall section, and with an open bottom end surface through which carbonylation particles can flow, each funnel paired with a moving bed flow regulator below and in proximity to the bottom end surface of each funnel, wherein each funnel contains a moving bed of carbonylation particles wherein these particles move with the force of gravity toward each funnel's bottom end surface and its paired regulator and wherein the downward flow of the carbonylation particles in each funnel is repeatedly stopped and started by the flow regulator, whereby, for at least one cross-flow funnel, the carbonylation gas flows from a distributor volume through the funnel's inlet gas-permeable wall section into the moving bed of carbonylation particles, the gas flowing through the bed of particles in a cross flow, the cross-flow being in a substantially horizontal cross-flow direction relative to the downward moving bed of particles, the gas then flowing through the second gas-permeable wall section of that funnel into a product-mixture gas collector volume;

inputting carbonylation particles through the one or more carbonylation particle inlets in the pressure vessel wall and placing carbonylation particles on one or more moving beds;

filling the void fractions of the interiors of each funnel with carbonylation gas thereby causing carbonylation of the carbonylation particles within the vessel shell;

generating gas pressure differences between a pair of carbonylation distributor and product-mixture gas collector volumes thereby causing substantially horizontal cross-flows through the downward moving bed of carbonylation particles held in a funnel between each such pair of distributor and collector volumes; and outputting reduced-sized, residue carbonylation particles from at least one funnel with the flow rate of particles controlled by the funnel's paired regulator.

2. The method of claim 1, wherein any carbonylation gas cross-flow that flows from a carbonylation gas distributor volume, across a cross-flow funnel and into a product-mixture gas collector volume is not bypassed by an alternate gas flow path from the same carbonylation gas distributor volume directly to the same product-mixture gas collector volume, without flowing through the same intervening cross-flow funnel.

3. The method of claim 1, wherein, for at least one funnel, the downward output of reduced-sized, residue carbonylation particles is regulated by the funnel's paired regulator so that the sizes of (a) the output reduced-sized, residue carbonylation particles at the funnel's bottom end surface and (b) the input larger-sized particles at the funnel's top base surface obey the funnel ratios condition.

4. The method of claim 1, including the step of maintaining the quantity of carbonylation particles held in each funnel.

5. The method of claim 4, wherein at least one funnel has a hopper positioned above and proximate to the funnel's top base surface, the interior of the funnel being open to the interior of the hopper through the top base surface of the funnel, the hopper holding an upper moving bed of buffering carbonylation particles whereby this upper moving bed of buffering carbonylation particles flows into and thereby replenishes the moving bed in the funnel underneath.

6. The method of claim 5, replenishment being required due to particle shrinkage.

7. The method of claim 5, wherein one or more regulators remove shrunk particles from the respective paired funnels above each of these regulators, thus requiring replenishment of the particles.

8. The method of claim 1, wherein a carbonylation particle inlet allows carbonylation particles to enter at least one hopper at a point above at least one funnel.

9. The method of claim 1, wherein the particles are selected from the group consisting of metallic nickel and iron and at least one other material.

10. The method of claim 4, wherein each of the pressure vessel's carbonylation particle outlets are provided to permit carbonylation particles to move from a moving bed regulator device and out of the pressure vessel's shell.

11. The method of claim 10, wherein each carbonylation gas distributor volume connects to a gas inlet, thereby allowing carbonylation gas to flow into each distributor volume from a gas inlet.

12. The method of claim 11, wherein each product-mixture gas collector volume connects to a gas outlet, thereby allowing product-mixture gas to flow out of each collector volume through a gas outlet, thereby allowing continuous carbonylation to occur in the reactor.

13. An apparatus for performing carbonylation of beds of carbonylation particles, the apparatus comprising:

a moving bed of carbonylation particles;

a reactor comprising:

an outer reactor pressure vessel shell wall and an interior to the shell wall, the shell wall having an upper end and a lower end with one or more carbonylation particle-passing inlets formed toward the upper end of the shell wall and one or more carbonylation particle-passing outlets formed toward the lower end of the shell wall;

one or more gas inlets and one or more gas outlets formed through the shell wall;

one or more carbonylation gas distributor volumes provided within the interior to the shell wall, each carbonylation gas distributor volume being connected to a gas inlet;

one or more product-mixture gas collector volumes, each product-mixture gas collector volume being connected to a gas outlet;

one or more carbonylation particle-holding hoppers provided in the interior of the shell;

one or more funnels each aimed generally at the lower end of the vessel shell, each funnel having an inlet gas-permeable wall section and an outlet gas-permeable wall section;

at least one gas-impermeable wall section formed between the gas permeable wall sections, each funnel further including a carbonylation particle-passing open bottom end surface; and a moving bed flow regulator paired and fitted to each funnel below and in proximity to the carbonylation particle-passing open bottom end surface of each funnel, wherein each funnel contains a moving bed of carbonylation particles.

14. The apparatus of claim 13, wherein the funnels are cross-flow funnels.

15. The apparatus of claim 13, wherein the carbonylation particle-passing outlets are positioned between the moving bed flow regulator and the shell.

16. The apparatus of claim 13, wherein at least one funnel includes a top base surface and wherein a hopper is positioned above and proximate to the funnel's top base surface, the interior of the funnel being open to the interior of the hopper through the top base surface of the funnel, the hopper holding an upper moving bed of buffering carbonylation particles whereby this upper moving bed of buffering carbonylation particles flows into and thereby replenishes the moving bed in the funnel underneath.

17. The apparatus of claim 13, wherein a carbonylation particle-passing inlet is associated with at least one hopper and a point above at least one funnel.

* * * * *